C. D. KARR.
BED SPRING.
APPLICATION FILED AUG. 22, 1917.

1,257,610.

Patented Feb. 26, 1918.

Inventor
Charles D. Karr
By Gillson & Gillson
Attorneys.

UNITED STATES PATENT OFFICE.

CHARLES D. KARR, OF HOLLAND, MICHIGAN.

BED-SPRING.

1,257,610.                    Specification of Letters Patent.        Patented Feb. 26, 1918.

Application filed August 22, 1917. Serial No. 187,696.

*To all whom it may concern:*

Be it known that I, CHARLES D. KARR, a citizen of the United States, residing at Holland, county of Ottawa, and State of Michigan, have invented certain new and useful Improvements in Bed-Springs, of which the following is a specification, and which are illustrated in the accompanying drawings, forming a part thereof.

The invention relates to built-up wire springs for spring beds, cushions and the like and more particularly to those which comprise a series of upright coil springs. The invention has special reference to the manner of connecting the surface turns of adjacent coil springs, the object of the invention being to provide a construction in which the parts may be readily assembled while the full range of relative movement between the parts is permitted by the flexing of the connecting elements and without frictional movement of one part upon another.

In the accompanying drawings.

The drawings illustrate details of two wire rings 10—11 and 12—13. These rings may be the surface turns of two adjacent upright coils of a bed spring or the like. Preferably the adjacent sides of the two rings have offset portions providing dents or shoulders 14—15 or 16—17. In carrying out the invention a helical spring 18 or 19 is employed as the only connecting element between the two rings 10—11 or 12—13.

Preferably the bore of the helical spring 18 or 19 is of substantially the same diameter as the wire from which the corresponding rings 10—11 or 12—13 are formed. It therefore follows that if the helical spring 18 or 19 has its opposite ends interwoven with the two rings 10—11 or 12—13 in such manner as to have telescopic engagement with the sides of the ring, a flexible but permanent connection is provided between the said parts.

Figure 1:
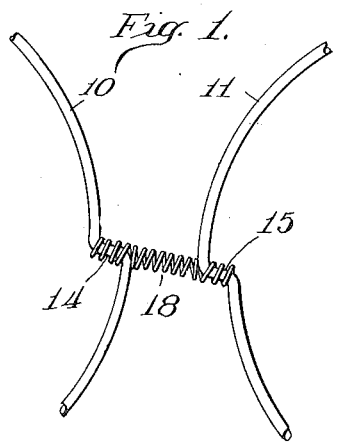
Figure 1 is a plan view showing details of the surface turns of two adjacent upright coil springs, the said parts being connected in the manner provided by the invention.
Figure 2:
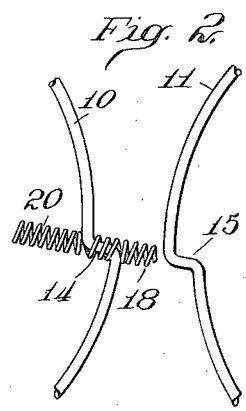
Fig. 2 is similar to Fig. 1 but illustrates one of the relative positions of the parts while being assembled.

In the form of construction illustrated in Figs. 1 and 2 the offset portions 14 and 15 of the rings 10—11 extend in approximately radial directions and the two ends of the connecting helical spring 18 are interwoven with these offset portions of the sides of the rings. The connecting helical spring 18 accordingly extends in a slightly inclined position between the rings. In assembling the parts one end, as 20, of the helical spring 18 is engaged with the side of the ring 10 at the outer end of the offset portion and the spring 18 is rotated to thread its coils along the offset portion 14 until the said spring extends for a substantial distance beyond the inner end of the offset portion 14. The other end, as 21, of the spring 18 is then engaged with the side of the ring 11 at the outer end of the offset portion 15. The spring 18 is now rotated in the opposite direction until the end 20 has been returned to a position adjacent the inner end of the offset portion 14. At this time the end 21 of the spring 18 will have reached the inner end of the offset portion 15 of the ring 11 and a permanent connection of the two rings has been obtained.

Figure 3:
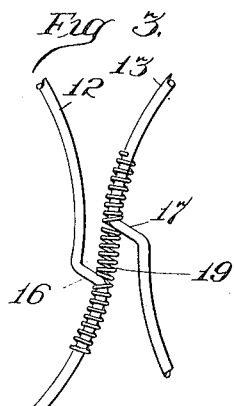
Fig. 3 is also similar to Fig. 1, but shows a modified construction.

In the form of construction illustrated in Fig. 3 the two ends of the connecting helical spring 19 have telescopic engagement with the sides of the rings 12 and 13, at opposite sides of the two offset portions 16 and 17. The method of application of the connecting helical spring is the same as that employed with the construction illustrated in Figs. 1 and 2 except that the connecting helical spring 19 is first threaded over the side of one of the rings, as 12, through a greater distance than is required in the finished construction. Thereafter the other end of the connecting helical spring 19 is engaged with the side of the other ring 13, immediately beyond the shoulder 17 and the spring is partly withdrawn from the side of the ring 12. This application of the spring 19 to the rings 12 and 13 is accomplished by rotating the spring 19 successively in opposite directions, as heretofore explained in describing the application of the helical spring 18 to the offset portions 14—15 of the rings 10—11.

When either form of construction is employed a full range of relative movement between the two adjacent rings 10—11 or 12—13, in any direction, is permitted by the flexing of the intermediate portions of the connecting helical spring 18 or 19 and this movement is permitted without any rubbing together of the connected parts. The invention accordingly provides a construction which is composed of a small number of parts which are readily assembled and this construction is both effective and noiseless in service.

I claim as my invention:

1. In a spiral spring bed bottom, spiral springs having large surface coils, abrupt offsets formed in, and practically at right angles with said surface coils, and helical springs interwoven with said offsets forming a diagonally located flexible connecting element between said coils.

2. In combination with the broad surface coils of a spiral spring bed bottom, offsets formed in said coils to produce straight bodies standing at an incline from the circle of the coils, and helical springs entwined over and around said bodies to form connecting elements diagonally from one coil to another.

3. In combination with the broad surface coils of a spiral spring bed bottom, long radial offsets integrally formed in the outer coils, and small helical springs interwoven with the offsets of adjacent coils forming a free flexible connection between the surface coils.

4. In a bed spring, in combination, a pair of horizontal wire rings being the ends of two upright coil springs, and a helical spring extending between and flexibly connecting the two rings, the bore of the helical spring being substantially of the same size as the wire from which the rings are formed and a substantial length of the helical spring immediately adjacent each end of the same being telescoped upon the side of the corresponding wire ring.

5. In a bed spring, in combination, a pair of horizontal wire rings being the ends of two upright coil springs, adjacent portions of the rings being formed with offsets providing oppositely facing shoulders in the sides of the two rings, and a helical spring extending between and flexibly connecting the rings, the bore of the helical spring being substantially of the same size as the wire from which the rings are formed and a substantial length of the helical spring immediately adjacent each end of the same being telescoped upon the side of the corresponding ring for a distance extending to the said shoulder.

CHARLES D. KARR.